March 14, 1967 — G. H. HAGERMAN — 3,308,695
APPARATUS FOR MACHINING A HELICAL ELEMENT
Filed Sept. 16, 1964 — 3 Sheets-Sheet 1

INVENTOR.
GILBERT H. HAGERMAN,
BY
ATTORNEYS.

March 14, 1967 G. H. HAGERMAN 3,308,695
APPARATUS FOR MACHINING A HELICAL ELEMENT
Filed Sept. 16, 1964 3 Sheets-Sheet 2

INVENTOR.
GILBERT H. HAGERMAN,
BY
ATTORNEYS.

March 14, 1967  G. H. HAGERMAN  3,308,695
APPARATUS FOR MACHINING A HELICAL ELEMENT
Filed Sept. 16, 1964  3 Sheets-Sheet 3

INVENTOR.
GILBERT H. HAGERMAN,
BY
ATTORNEYS.

United States Patent Office 3,308,695
Patented Mar. 14, 1967

3,308,695
APPARATUS FOR MACHINING A HELICAL ELEMENT
Gilbert H. Hagerman, New Carlisle, Ohio, assignor to Robbins & Myers, Inc., Springfield, Ohio, a corporation of Ohio
Filed Sept. 16, 1964, Ser. No. 396,876
5 Claims. (Cl. 82—5)

This invention relates to an apparatus for machining a helical element and while the apparatus is useful for machining all sorts of helical workpieces, it is intended primarily for, and particularly suited to, the machining of rotor elements for the progressive cavity type of pumps originally disclosed in the Moineau Patent 1,892,217.

In said Moineau patent various families of profiles were disclosed which could coact as gears and which could be used as pumps. Pumps and compressors based on the teachings of said Moineau patent have been sold commercially in the United States for many years under the trademark "Moyno" by applicant's assignee.

As generally constituted, these pumps generally comprise a rotor comprising a single helical thread and a stator having a double helical thread. The rotor of such a pump has a circular cross section normal to its axis at any point along its length and when such a rotor coacts with a mating stator having double thread, a series of pumping pockets are formed between the rotor and stator. As the rotor revolves, it also orbits within the stator; that is, the rotor rotates about its own axis and the axis of the rotor moves in a circular path around the axis of the stator. As a result of this motion, the pumping pockets move through the pump from one end to the other.

Rotors for pumps as above described have over the years been manufactured upon an apparatus disclosed and claimed in Hagerman, Patent No. 2,189,868. The apparatus disclosed in said Hagerman patent has been used successfully for a great many years in making such pump rotors but the speed of operation of those machines has been relatively slow. All of the machining was done by a single cutter bit. Such a cutter bit must have a fairly sharp point and therefore wears quite rapidly. While this objection could be lessened by providing a rounded tool bit, such a bit would not cut a proper surface, particularly on rotors having a short pitch.

With the foregoing considerations in mind, it is an object of the present invention to provide a machine wherein the cutting load is divided among a plurality of cutter bits so that the rate of metal removal in the machining operation can be greatly increased while still maintaining the desired geometry of the finished rotor helix.

It is another object of the invention to provide an apparatus which is highly flexible in that it may by simple adjustment be modified to machine rotors of various diameters and various pitch lengths and of both right and left hand.

These and other objects of the invention which will be described in more detail hereinafter or which will be apparent to one skilled in the art upon reading these specifications are accomplished by that certain construction and arrangement of parts of which the following describes an exemplary embodiment.

Reference is made to the drawings in which.

Figure 1:
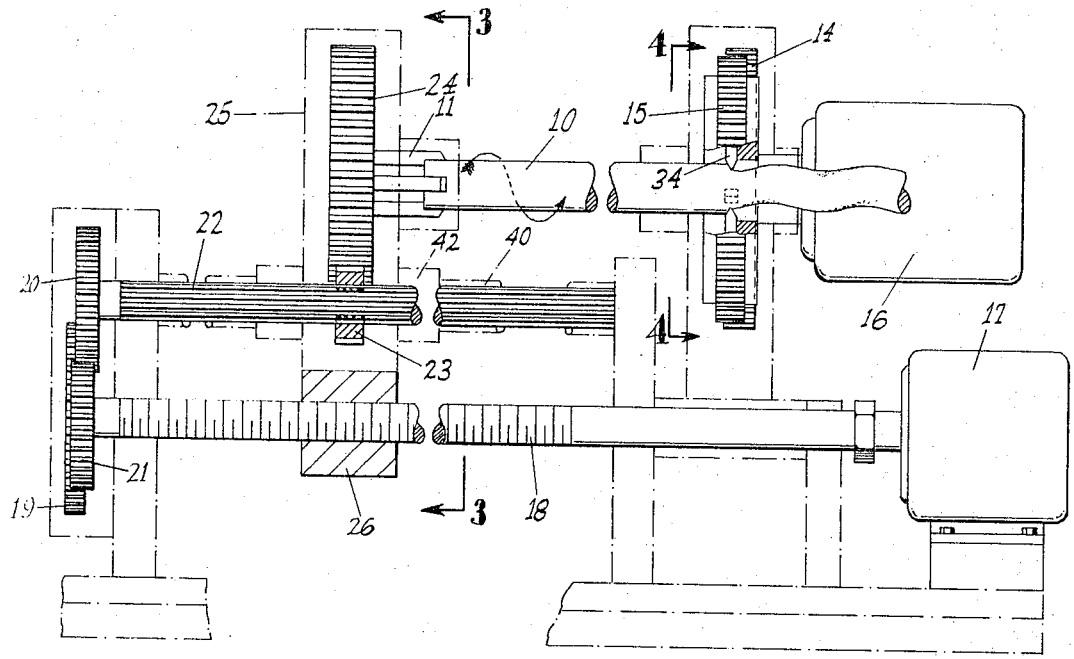
FIG. 1 is a more or less diagrammatic representation of the apparatus.
Figures 2, 3:
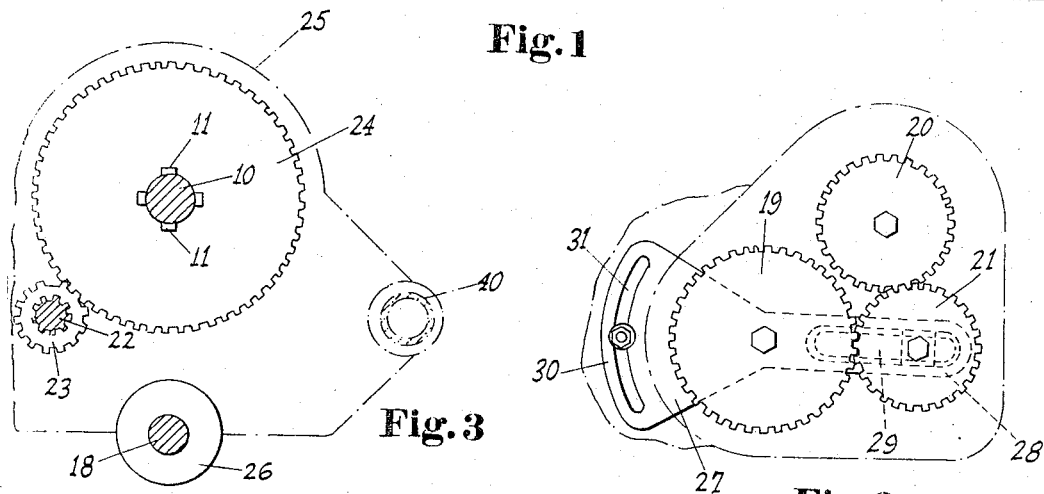
FIG. 2 is a fragmentary end elevational view as seen from the left of FIG. 1.
FIG. 3 is a cross sectional view taken on the line 3—3 of FIG. 1.

Briefly, in the practice of the invention and with reference to FIG. 1, the workpiece 10 is held in a chuck 11 and supported by means of a work support 12 as it passes through a cutter head 13. The cutter head is driven at high speed by means of the gears 14, 15 from the electric motor or prime mover 16.

In producing the helical workpiece in this apparatus, it is necessary that the axis of the workpiece 10 and the axis of the cutter head 13 be displaced so that the workpiece 10 is fed into the cutter head eccentrically. The workpiece must be moved axially into and through the cutter head while at the same time it must be slowly rotated. For this purpose a second motor 17 drives a lead screw 18. The lead screw 18 carries a gear 19 which drives a gear 20 through an intermediate gear 21. The gear 20 is secured to a spline shaft 22 on which a spline pinion 23 is mounted. The spline pinion 23 drives the gear 24 secured to the chuck 11 and the pinion 23 and gear 24 and chuck 11 are all mounted in a housing indicated generally at 25 which is provided with a nut 26 in engagement with the lead screw 18. From the foregoing description it will be understood that when the motor 17 is running, both the lead screw 18 and the spline shaft 22 are rotating. By virtue of the engagement of the nut 26 with the lead screw 18, the housing 25 and its associated parts are translated axially of the workpiece 10 to feed it into the cutter head 13. By virtue of the spline connection between the spline shaft 22 and pinion 23 which meshes with the gear 24, the chuck 11 is concurrently rotated.

It will be understood that the pitch of the helix produced in the workpiece 10 by this machine can be changed by changing the gear ratio between the gears 19 and 20. For this purpose, the gear 21 may be mounted upon a plate 27 which may be pivoted on the axis of the gear 19 and which has an extension 28 provided with a slot 29 so that the gear 21 or a substitute of larger or smaller diameter may be mounted at a suitable point along the slot 29. To take care of changes in diameter of the gear 21, the other end of the plate 27 is fan-shaped as at 30 and is provided with the arcuate slot 31 whereby the axis of the gear 21 may be angularly displaced for gears of different diameters. It will be understood that to change the hand of the helix it is only necessary to insert an additional gear in the train to reverse the direction of rotation of the spline shaft 22 with respect to the direction of rotation of the lead screw 18.

Figure 4:
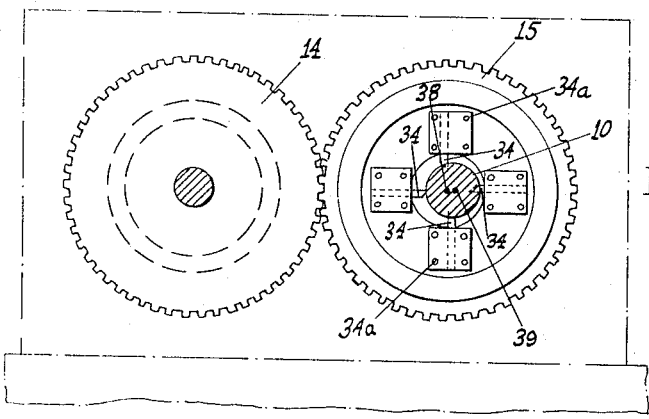
FIG. 4 is a cross sectional view taken on the line 4—4 of FIG. 1.
Figure 5:
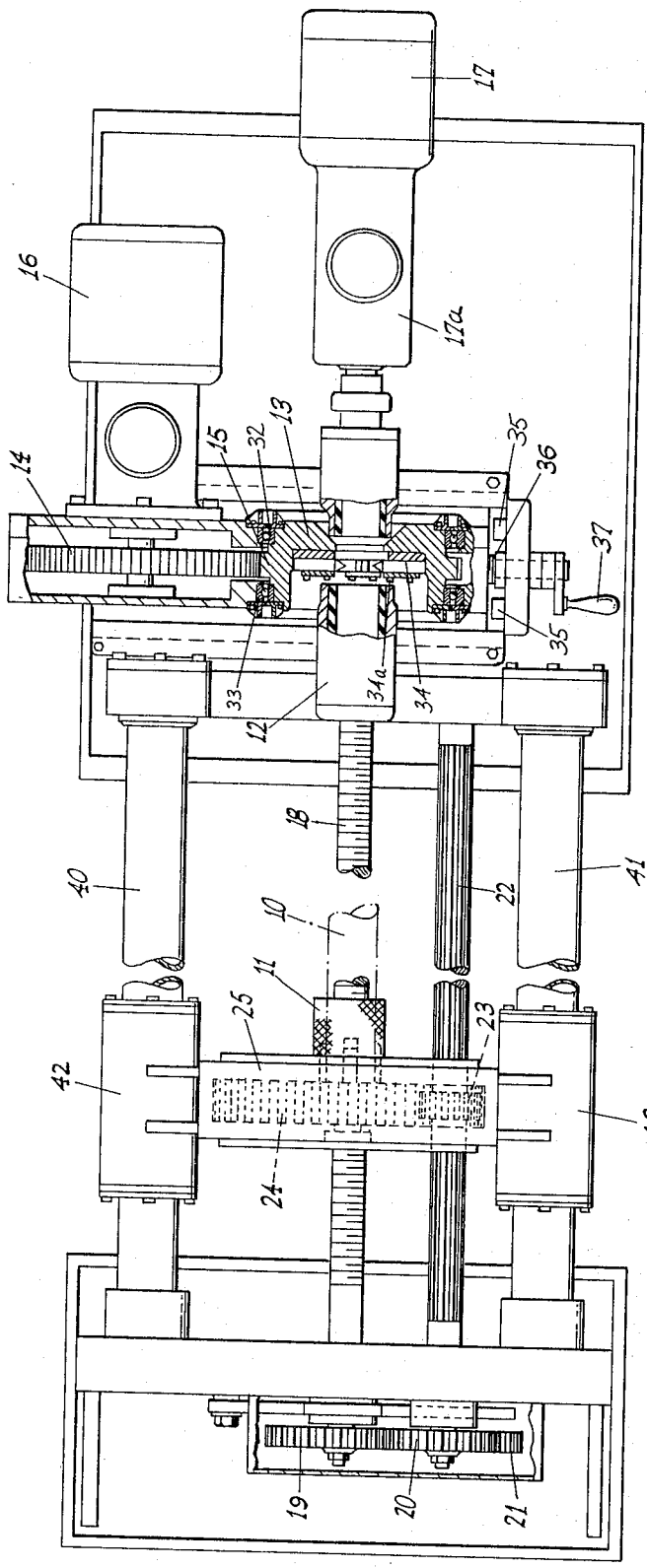
FIG. 5 is a plan view of the apparatus.
Figure 6:
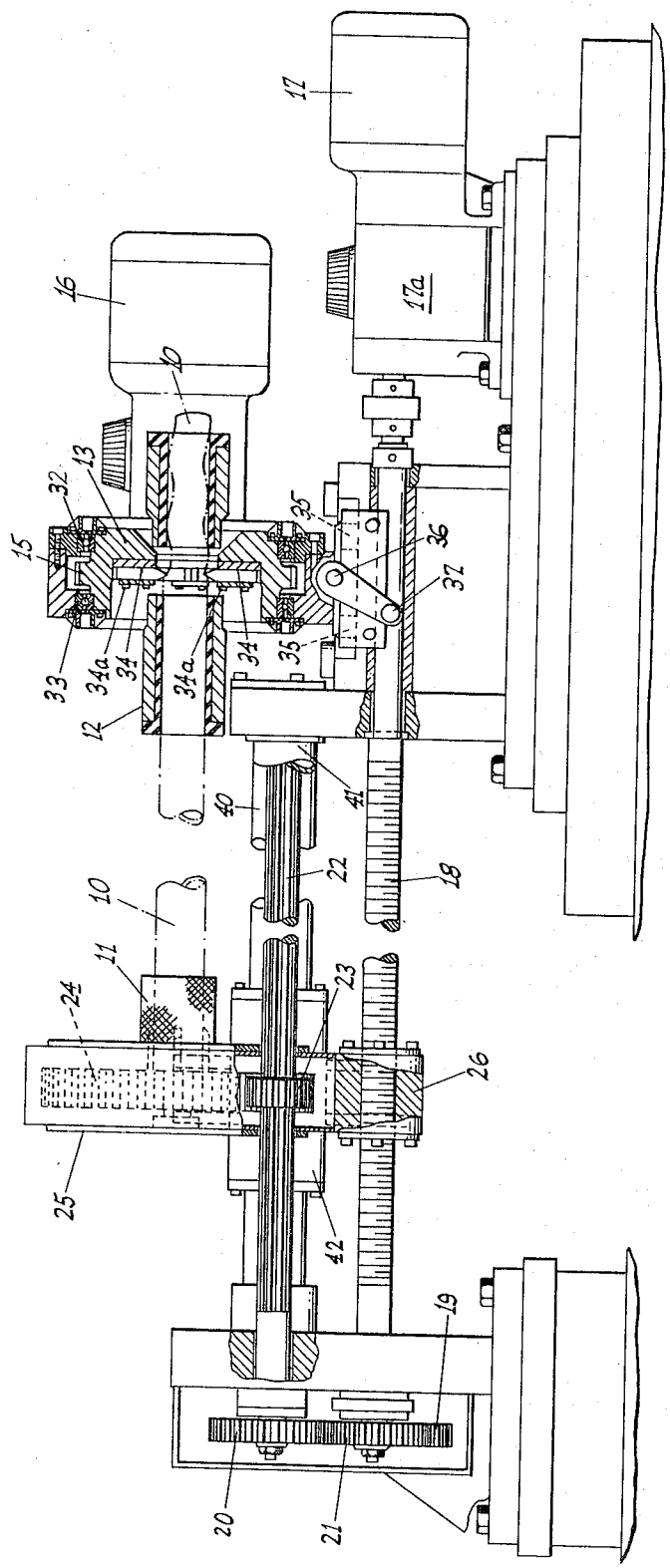
FIG. 6 is a front elevational view of the same.

Referring now to FIGS. 5 and 6 which show the apparatus in more detail, the various parts insofar as applicable carry the same reference numerals. The cutter head indicated generally at 13 is mounted by means of ball bearings, as shown at 32 and 33, and is provided with the external teeth constituting the gear 15. Preferably four cutters 34 are mounted in the cutter head and their position radially is adjustable by loosening the several bolts 34a and sliding the cutter bits radially inward or outward. The entire assembly of the cutter head is mounted on ways 35 and a lead screw 36 engages a nut fixed in the cutter head 13 so that by rotation of the crank 37 the entire cutter head assembly can be moved transversely of the axis of the workpiece. In this way the eccentricity of the helix can be determined. By reference to FIG. 4, it will be seen that the cutter head is rotating about the axis 38 while the workpiece is being rotated about its own axis at 39. The distance between the axes 38 and 39 is adjusted by rotation of the crank 37.

The chuck 11 is mounted in the housing 25 as heretofore outlined and this housing is accurately guided on the work guides or ways 40 and 41 by means of the sleeves 42 and 43. As heretofore pointed out, the lead screw 18 is driven by the motor 17 and, by its engagement with the nut 26 mounted in the carriage 25, produces translatory movement of the chuck 11. The rotation of the lead screw 18 is transmitted through the gears 19, 21 and 20 to the spline shaft 22 and thence through the pinion 23 and the gear 24 to the chuck 11. The motor 17 drives the lead screw 18 through a gear reducer 17a because, as will be clear, the speed of rotation and the speed of translation of the workpiece 10 is relatively slow while the rotation of the cutter head 13 is relatively fast. By virtue of the spline connection between the shaft 22 and the pinion 23, rotation is transmitted to the chuck while the entire carriage 25 is moving along the ways 40 and 41.

From the foregoing description, it will be clear that the machine of the present invention will produce rotors having a superior surface finish in much less time. This is because of the fact that the cutting load is divided equally among four cutter bits and because the load is divided among the four cutter bits, the fairly sharp points of the cutter bits wear much longer and still produce accurately the geometry required in the finished rotors. It will also be understood that rotors of either hand may be machined and that the diameter of the circular cross section of the rotor may be readily adjusted as well as its pitch and its eccentricity, so that the machine is extremely versatile.

The embodiments of the invention in which an exclusive property or privilege is claimed are defined as follows:

1. In an apparatus for machining an elongated, rodlike workpiece, to create therefrom a helical element having a circular cross section normal to its axis at any point along its length, said apparatus comprising a chuck, rotatably mounted on one axis, for holding said workpiece by one end, a cutter head rotatably mounted on another axis, displaced from said one axis, and containing a plurality of cutting elements radially disposed therein with their cutting edges inwardly directed, means for rotating said cutter head at relatively high speed, a fixed work support for said workpiece immediately adjacent said cutter head, means for advancing said chuck along said one axis to feed said workpiece at relatively slow speed, eccentrically into said cutter head, and means for concurrently rotating said chuck and the workpiece held thereby about said one axis, at relatively slow speed.

2. Apparatus according to claim 1, wherein said cutter head is adjustable along a path normal to its axis to vary the displacement of said other axis from said one axis.

3. Apparatus according to claim 1, wherein means are provided to vary the speed of rotation of said chuck with respect to the speed of advancement thereof, to change the pitch of said helical element.

4. Apparatus according to claim 1, wherein said chuck is rotatably mounted in a housing and said housing is mounted on ways parallel to its axis, and wherein a lead screw is disposed parallel to said ways, means for rotating said lead screw, a nut on said lead screw and secured to said housing, whereby rotation of said lead screw produces movement of said housing along said ways, a spline shaft disposed parallel to said lead screw, a gear train for driving said spline shaft from said lead screw, a pinion having an internal spline engaging said spline shaft and mounted in said housing, a gear in said housing for rotating said chuck, said gear in said housing being disposed in meshing relation with said pinion, and means to change the gear ratio between said lead screw and spline shaft to change the pitch of said helical element.

5. Apparatus according to claim 4, wherein said cutter head is adjustable along a path normal to its axis to very the displacement of said other axis from said one axis.

References Cited by the Examiner
UNITED STATES PATENTS

| | | | |
|---|---|---|---|
| 1,392,528 | 10/1921 | Schmick | 82—5 |
| 2,262,178 | 11/1941 | Gest et al. | 82—20 |
| 2,749,807 | 6/1956 | Burgsmuller | 90—11.4 |
| 2,875,661 | 3/1959 | Du Coudrey | 82—5 |

OTHER REFERENCES

"How To Run a Lathe," South Bend Lathe Works, Ind., 1942, pp. 21, 69.

WILLIAM W. DYER, JR., *Primary Examiner.*

LEONIDAS VLACHOS, *Examiner.*